Figures 1, 2:
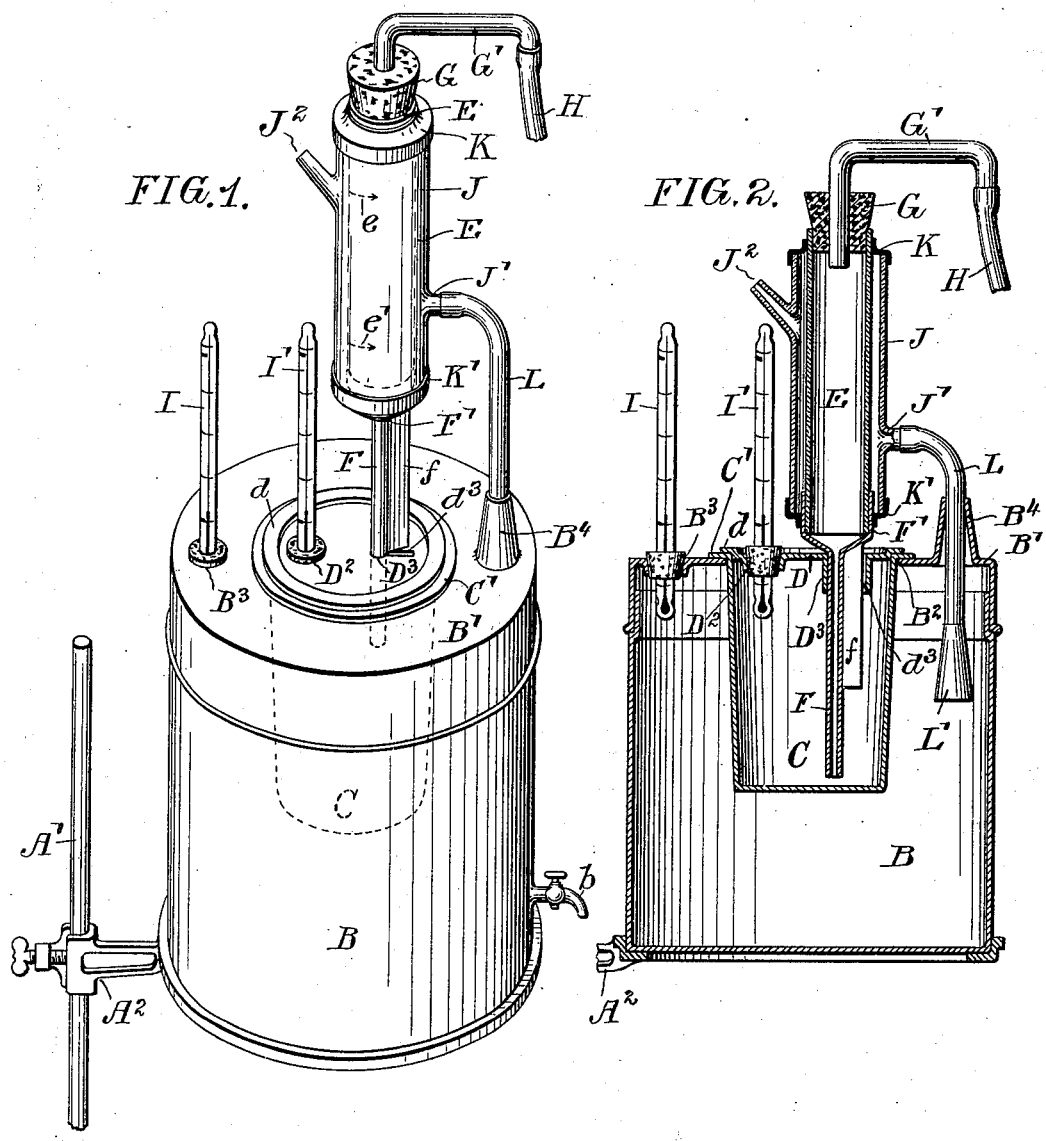

No. 687,334. Patented Nov. 26, 1901.
J. R. REILLY.
VISCOSIMETER.
(Application filed Apr. 17, 1901.)

(No Model.)

Witnesses:
Inventor:

UNITED STATES PATENT OFFICE.

JOY RIDGWAY REILLY, OF PHILADELPHIA, PENNSYLVANIA.

VISCOSIMETER.

SPECIFICATION forming part of Letters Patent No. 687,334, dated November 26, 1901.

Application filed April 17, 1901. Serial No. 56,210. (No model.)

*To all whom it may concern:*

Be it known that I, JOY RIDGWAY REILLY, a citizen of the United States of America, residing in the city and county of Philadelphia, in the State of Pennsylvania, have invented certain new and useful Improvements in Viscosimeters, of which the following is a true and exact description, reference being had to the accompanying drawings, which form a part thereof.

My invention relates to the construction of viscosimeters for measuring the viscosity of oils, and may be described as an improvement upon my patented viscosimeter described in my Patent No. 671,658, of April 9, 1901, the object of my present invention being primarily to so construct the viscosimeter that its readings will not be affected by variations in the level of the oil in the receptacle from which the measuring device derives its supply and into which it delivers the oil. This object I accomplish by providing means whereby the measuring device can be shifted in a vertical direction, so that after receiving its charge it can be moved up to such a level that the end of the measuring-tube will come above the level of the full charge of oil in the receptacle.

Another object which I have in view is to prevent sensible variations in the temperature of the oil during the operation of testing its viscosity, an object which I attain by providing a jacket to surround the graduated chamber of the measuring device and connecting it with the water-bath, by which the oil is heated to proper temperature, so as to provide a steam-jacket to said chamber.

Reference is now had to the drawings in which my invention is illustrated, and in which—

Figure 1 is a perspective view of my improved apparatus, and Fig. 2 a central vertical section thereof.

A' indicates the standard, on which the bath is supported above a lamp. (Not shown.)

A² is an adjustable bracket working on the standard and supporting the water-bath B, which I have shown with a cock $b$ for drawing off the water.

B' is the lid of the bath, having an opening B², through which the oil-receptacle is inserted, an opening B³ for a thermometer, and an opening B⁴ for the escape of hot vapor or steam.

C is the oil-receptacle, formed, as shown, with a flange C', which rests on the rim of the opening B² when the receptacle is in place.

D indicates a lid resting on the receptacle C by means of its flange, (indicated at $d$.) This lid, as shown, is formed with an opening D² for the admission of a thermometer and an opening D³ for the admission of a measuring-tube, said opening being preferably made with a slight extension $d^3$ for the purpose hereinafter noted.

E is a transparent chamber, preferably made of glass tubing and graduated, as indicated at $e\, e'$. To the lower end of this tube or chamber E is secured the enlarged head F' of the measuring-tube F, which for reasons described in my former patent should preferably be of metal. In my new construction I preferably form this tube F with a laterally-extending feather $f$, extending from its upper portion, as shown.

G is a stopper for the top of the tube E, in which is inserted a tube G', having connected with it a compressible and flexible tube H.

I and I' are thermometers, one inserted in the water-bath and the other in the oil-receptacle C.

J is the jacket-casing, conveniently formed of a section of glass tubing larger in diameter than the tube E. This jacket-tube J is provided with a steam-entrance nozzle J' and a steam-exit nozzle J² and is conveniently secured in place on the tube or chamber E by rubber gaskets, as indicated at K and K'.

L is a flexible tube connected with the nozzle J' and, as shown, passing down through the spout B⁴, which is preferably given a slightly conical form, a metal nut L' of similar form being fastened to the end of the tube L.

In operation the oil to be tested is placed in the receptacle C and the receptacle placed in the water-bath and heated thereby until the thermometer indicates that the oil is at a proper temperature. The measuring device is inserted in the receptacle C, as shown in Fig. 2, and the operator then sucks the air out of the tube E, drawing the oil into said tube or chamber and holding it there by squeezing the compressible pipe H. The measuring device is then lifted vertically, and when the feather F is above the lid D it is slightly turned, so that the feather will lodge on the top of the lid, as shown in Fig. 1. The operator then observes the time consumed in the escape of the oil from the level indicated by the grade-mark $e$ to that indicated by the grade-mark $e'$, this time indicating the viscosity of the oil tested, and it will be observed that as the bottom of the tube F is above the higher level attained by the oil in the receptacle C the operation of the apparatus is entirely unaffected by a varying head of oil. Consequently it is not necessary that the oil charged into the receptacle C should be so carefully measured. It will be obvious that the hot vapors or steam from the bath D will pass through tube L into the steam-jacket J, keeping it at substantially uniform temperature and protecting the oil contained in it from variation in temperature, which might interfere with the accuracy of the observation. In the particular device shown the lifting of the measuring device by bringing the cone L' into contact with the cone-spout $B^4$ closes the joint tightly and insures that any steam from the water-bath will pass to the steam-jacket and perform its functions.

Having now described my invention, what I claim as new, and desire to secure by Letters Patent, is—

1. In a viscosimeter, the combination with an oil-receptacle C and cover therefor, of a measuring device consisting of a transparent graduated oil-chamber E having a pipe F extending from its lower end, means for supporting the chamber E and pipe F above the receptacle C in two positions in one of which the pipe F extends well down in receptacle C and in the other of which the end of said pipe comes above the top level of the oil in said receptacle and means whereby suction can be applied to the top of receptacle C or atmospheric pressure admitted thereto at will.

2. In a viscosimeter, the combination with an oil-receptacle C of a measuring device consisting of a transparent graduated oil-chamber E having a pipe F extending from its lower end, a feather $f$ extending from the side of the upper part of tube F, a lid resting on the receptacle C and having formed in it a passage $D^3$ $d^3$ for the pipe and feather and means whereby suction can be applied to the top of receptacle C or atmospheric pressure admitted thereto at will.

3. In a viscosimeter, a water-bath B in combination with an oil-receptacle C immersed therein, a measuring device consisting of a transparent graduated oil-chamber E having a measuring-tube F extending from its lower end into the receptacle C, a jacket J surrounding chamber E and connected with the water-bath B to be heated therefrom and means for applying suction to the top of chamber E or admitting atmospheric pressure thereto at will.

4. In a viscosimeter, a water-bath B in combination with an oil-receptacle C immersed therein, a measuring device consisting of a transparent graduated oil-chamber E having a measuring-tube F extending from its lower end into the receptacle C, means for vertically adjusting the chamber E and tube F above and in the receptacle C, a jacket J surrounding chamber E, flexible tubing connecting said jacket with the water-bath B to be heated therefrom and means for applying suction to the top of chamber E or admitting atmospheric pressure thereto at will.

JOY RIDGWAY REILLY.

Witnesses:
CHAS. F. MYERS,
D. STEWART.